United States Patent
Ohyama et al.

(10) Patent No.: US 7,551,796 B2
(45) Date of Patent: Jun. 23, 2009

(54) IMAGE PROCESSING APPARATUS, IMAGE DATA GENERATION AND TRANSMISSION METHOD AND IMAGE DATA GENERATION AND TRANSMISSION PROGRAM

(75) Inventors: Maki Ohyama, Kanagawa (JP); Hiroyuki Kawamoto, Kanagawa (JP); Satoshi Ohkawa, Tokyo (JP); Naoki Sugiyama, Kanagawa (JP); Arai Hiroshi, Saitama (JP); Yasunobu Shirata, Tokyo (JP); Atsushi Togami, Kanagawa (JP); Takeharu Tone, Tokyo (JP); Taira Nishita, Tokyo (JP); Isao Miyamoto, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 757 days.

(21) Appl. No.: 11/082,912

(22) Filed: Mar. 18, 2005

(65) Prior Publication Data
US 2005/0243375 A1     Nov. 3, 2005

(30) Foreign Application Priority Data
Mar. 19, 2004    (JP)    ............................ 2004-080637

(51) Int. Cl.
*G06K 9/40*     (2006.01)
(52) U.S. Cl. ........................ 382/274; 358/1.1; 358/1.17; 358/2.1; 358/463; 358/474; 382/167; 382/232
(58) Field of Classification Search .................. 358/1.9, 358/2.1, 1.11, 1.17, 463, 474; 382/167, 232, 382/274
See application file for complete search history.

(56) References Cited

U.S. PATENT DOCUMENTS

| | | | | |
|---|---|---|---|---|
| 5,175,632 A | * | 12/1992 | Hayashi et al. | 358/401 |
| 5,335,084 A | * | 8/1994 | Munemasa et al. | 358/403 |
| 5,987,175 A | * | 11/1999 | Imaizumi et al. | 382/232 |
| 6,778,288 B1 | * | 8/2004 | Ogaki et al. | 358/1.15 |
| 7,352,496 B2 | * | 4/2008 | Han | 358/474 |
| 2004/0120004 A1 | * | 6/2004 | Okamoto et al. | 358/1.15 |
| 2004/0190019 A1 | * | 9/2004 | Li et al. | 358/1.9 |
| 2004/0207883 A1 | * | 10/2004 | Han | 358/3.26 |
| 2005/0243375 A1 | * | 11/2005 | Ohyama et al. | 358/2.1 |

FOREIGN PATENT DOCUMENTS

| | | |
|---|---|---|
| JP | 06-332636 | 12/1994 |
| JP | 09-163153 | 6/1997 |

(Continued)

*Primary Examiner*—Gregory M Desire
(74) *Attorney, Agent, or Firm*—Dickstein Shapiro LLP

(57) ABSTRACT

An image processing apparatus connected to an external apparatus via a network includes an selecting unit for selecting an application mode and an image quality mode, a scanning unit for scanning an original document, a scanning correction unit for generating image data from the scanned document, a storage unit for storing the image data and the process mode information, a compression unit for compressing the image data, an extension unit for extending the compressed image data, a data format converting unit for converting a data format of the image data according to the application mode and the image quality mode, and a communication unit for communicating the image data with the external apparatus. The data format converting unit receives image data having a first data format, and outputs the image data having a second data format, wherein the first and second data format are either a data format dedicated to the image processing apparatus or a general data format.

31 Claims, 14 Drawing Sheets

FOREIGN PATENT DOCUMENTS

| | | |
|---|---|---|
| JP | 09-186835 | 7/1997 |
| JP | 10-190927 | 7/1998 |
| JP | 11-331844 | 11/1999 |
| JP | 2000-333026 | 11/2000 |
| JP | 2001-016453 | 1/2001 |
| JP | 2001-506835 | 5/2001 |
| JP | 2001-157039 | 6/2001 |
| JP | 2001-223828 | 8/2001 |
| JP | 2001-251522 | 9/2001 |
| JP | 2002-077627 | 3/2002 |
| JP | 2004-140683 | 5/2004 |

\* cited by examiner

FIG. 16

| d00 | d01 | d02 | d03 | d04 |
| --- | --- | --- | --- | --- |
| d10 | d11 | d12 | d13 | d14 |
| d20 | d21 | d22 | d23 | d24 |
| d30 | d31 | d32 | d33 | d34 |
| d40 | d41 | d42 | d43 | d44 |

IMAGE PROCESSING APPARATUS, IMAGE DATA GENERATION AND TRANSMISSION METHOD AND IMAGE DATA GENERATION AND TRANSMISSION PROGRAM

This application claims priority to Japanese patent application No. 2004-080637 filed Mar. 19, 2004, the entire contents of which are hereby incorporated by reference herein.

FIELD OF THE INVENTION

The present invention relates to an image processing apparatus an image data generation and transmission method, and an image data generation and transmission program.

BACKGROUND OF THE INVENTION

Networked scanning systems including digital-processing apparatuses (e.g., digital copier and image scanning apparatus) connected to a network are publicly known. In such networked scanning systems, scan devices, included in the digitally-processing apparatuses, scan original document images and the scanned image data can be transmitted to terminal apparatuses (e.g., personal computer) connected to the network.

Existing systems use an extension box compatible to the architecture of a mainframe computer system. In such systems, an image input unit of an image forming apparatus scans an image. The scanned image data is stored in a hard disk unit (i.e., scan box) in the extension box. These systems are configured to share the image data with a plurality of terminal apparatuses (e.g., personal computers) connected to a network.

Scan parameters, such as resolution, grayscale, magnification, to be scanned face, image size, and area to be stored, are selected before scanning a document image. The scanned image data is transmitted to an image processing unit which processes the scanned image data with the selected scan parameters.

However, these systems do not carry out color coordinate conversion (i.e., from the R (red), G (green), and B (blue) system to the C (cyan), M (magenta), Y (yellow), and K (black) system), grayscale correction, or image data compression processes because these systems do not generate data for printout.

The processed image data is transmitted to the extension box. In the extension box, the image data is stored in the scan box allocated to a predetermined disk area in the hard disk unit.

After accumulating all of the image data for the original document image in the scan box, a client apparatus connected to the network retrieves the image data from the scan box.

However, these systems use one data format for copying data purposes and another format transmitting data.

Therefore, even when a same digital image processing apparatus is used for producing a printout, respective printouts made from the same image data may have different data formats.

Furthermore, a user pushes a copy button to copy a document, and pushes a scan button to scan an image to be transmitted later.

Therefore, the user needs to scan the same document twice when the user wants to copy and transmit the document. This is inconvenient for the user.

In addition, the system may employ a special format to store the image data in the hard disk unit, and a special data compression algorithm to economize the memory used.

Therefore, the user cannot review and edit such image data with publicly available applications when the user receives the image data at an external client apparatus.

Another system comprises a method for controlling multi-functions such as copying, scanning, printing, and faxing.

This system scans a document image, generates image data, prepares attribute data from the image data, and stores the image data and corresponding attribute data for each pixel in an image storing, unit.

When transmitting image data to an external client apparatus, the image data is converted to a predetermined data format.

This system does not store process mode information, selected by an operation unit, in the hard disk unit.

Therefore, when the image data, stored in the hard disk unit, is transmitted to an external client apparatus, the image data is converted to a data format independent of the process mode information selected by the operation unit.

Furthermore, this system requires that several attributes are managed in addition to image data. Therefore, this system leads to an increase in complexity.

SUMMARY OF THE INVENTION

The present invention provides an image processing apparatus connected to an external apparatus via a network.

In one exemplary embodiment, a novel image processing apparatus, connected to an external apparatus via a network, includes a selecting unit, a scanning unit, a scanning correction unit, a storage unit, a compression unit, an extension unit, a data format converting unit, and a communication unit. The selecting unit selects an application mode and an image quality mode. The scanning unit scans an original document to generate image signals. The scanning correction unit generates image data by conducting predetermined image processing in accordance with the image signals. The storage unit stores the image data and the application mode and the quality mode. The compression unit compresses the image data when storing the image data to the storage unit. The extension unit extends (i.e., uncompresses) the compressed image data. The data format converting unit converts the data format of the image data according to the application mode and the image quality mode. The communication unit communicates the image data with the external apparatus.

The data format converting unit includes a data extension unit configured to extend the compressed image data, an image processing unit configured to conduct a second predetermined image processing to the extended image data, and a data compression unit configured to compress the extended image data.

The data format converting unit receives image data having a first data format, and outputs the image data having a second data format, wherein the first and second data formats are either dedicated to the image processing apparatus or a general data format.

The data format converting unit includes a resolution converting unit configured to convert a resolution level of image data input to the data format converting unit.

The data format converting unit includes a color space conversion unit configured to convert a color space of image data to another color space that is independent of the characteristics of the image processing apparatus.

In the above-mentioned image processing apparatus, the data format converting unit includes a monochrome converting unit configured to convert color image data to monochrome image data.

The data format converting unit includes a spot noise elimination unit configured to conduct a spot noise elimination process on the image data.

The data format converting unit includes a filtering unit configured to conduct a predetermined filtering process on the image data.

The data format converting unit includes a concentration gamma processing unit configured to conduct a predetermined concentration gamma processing on the image data.

The data format converting unit includes a binary-format processing unit configured to convert multi-value image data.

The data format converting unit further conducts image processing to the image data, input to the data format converting unit, according to an application mode and an image quality mode designated by the external apparatus and received by the data format converting unit via the communication unit.

In one exemplary embodiment, a novel method of image data generation and transmission is conducted in an image processing apparatus connected to an external apparatus via a network. The method includes the steps of selecting, scanning, correcting, storing, converting, and transmitting image data. The selecting step selects an application mode and image quality mode. The scanning step scans an original document to generate predetermined image signals. The correcting step corrects the predetermined image signals to obtain image data. The storing step stores the image data, the application mode and the image quality mode. The converting step converts an attribute of the image data according to the application mode and the image quality mode. The transmitting step transmits the image data converted in the converting step to the external apparatus.

The above-mentioned method of image data generation and transmission further includes the steps of, requesting and designating the image data. In the requesting step, the external apparatus requests an acquisition of the image data. The designating step designates the application mode and the image quality mode for the requested image data. The converting step converts an attribute of the image data according to the application mode and the image quality mode designated in the designating step.

In the above-mentioned method of image data generation and transmission, the converting step includes a data extension unit (i.e., uncompression) configured to extend the compressed image data, an image processing unit configured to conduct a second predetermined image processing to the extended image data, and a data compression unit configured to compress the extended (i.e., uncompressed) image data.

In the above-mentioned method of image data generation and transmission, the converting step receives image data having a first data format, and outputs the image data having a second data format, wherein the first data format is either a data format dedicated to the image processing apparatus or a general data format, and the second data format is either a data format dedicated to the image processing apparatus or a general data format.

In the above-mentioned method of image data generation and transmission, the converting step converts an attribute of the image data stored in the storing step according to the application mode and the image quality mode selected in the selecting step.

In the above-mentioned method of image data generation and transmission, the converting step converts an attribute of the image data stored in the storing step according to the application mode and the image quality mode designated from the external apparatus in the designating step.

In the above-mentioned method of image data generation and transmission, the converting step further includes the steps of extending, altering, changing, and compressing. The extending step extends (i.e., uncompresses) compressed image data. The altering step alters the resolution of the extended image data. The changing step changes a color space of the resolution altered image data to another color space that has characteristics independent from those of the image processing apparatus. The compressing step compresses changed the image data.

The converting step further includes the steps of eliminating, filtering, gamma-processing, and binary-formatting. The eliminating step eliminates a spot noise from the monochrome image data. The filtering step filters the monochrome image data. The gamma-processing step conducts gamma-processing to the monochrome image data. The binary-formatting step formats the monochrome image data in binary-format.

In one exemplary embodiment, a novel image data generation and transmission program including computer-readable instructions that, when executed by a computer of an image processing apparatus connected to an external apparatus via a network, instruct the image processing apparatus to carry out a method of image data generation and transmission. The image data generation and transmission program includes the steps of selecting, scanning, correcting, storing, converting, transmitting. The selecting step selects an application mode and an image quality mode. The scanning step scans an original document to generate predetermined image signals. The correcting step corrects the image signals to obtain image data. The storing step stores the image data and the application mode and the image quality mode. The converting step converts an attribute of the image data according to the application mode and the image quality mode. The transmitting step transmits the image data converted in the converting step to the external apparatus.

The above-mentioned image data generation and transmission program further includes the steps of requesting and designating. The requesting step requests, by an external apparatus, acquisition of the image data. The designating step designates an application mode and an image quality mode for the acquisition requested image data. The converting step converts an attribute of the image data according to the application mode and the image quality mode designated in the designating step.

The computer readable instructions are stored in a computer readable medium provided in the image processing apparatus. The computer-readable instructions are downloaded from the network.

In one exemplary embodiment, a computer-readable medium stores an image data generation and transmission program. The computer readable medium stores computer-readable instructions that, when executed by a computer of an image forming apparatus connected to an external apparatus via a network, instruct the image forming apparatus to carry out a method of image data generating and transmitting. The image data generation and transmission program includes the steps of selecting, scanning, correcting, storing, converting, transmitting. The selecting step selects an application mode and an image quality mode. The scanning step scans an original document to generate image signals. The correcting step corrects the image signals to obtain image data. The storing step stores the image data and the application mode and the image quality mode. The converting step converts an attribute of the image data according to the application mode and the image quality mode. The transmitting step transmits the image data converted in the converting step to the external apparatus.

In the above-mentioned computer-readable medium storing the image data generation and transmission program, the image data generation and transmission program further includes the steps of requesting and designating. The requesting step requests, by an external apparatus, the acquisition of image data. The designating step designates an application mode and an image quality mode for the acquisition requested image data. The converting step converts an attribute of the image data according to the application mode and the image quality mode designated in the designating step.

BRIEF DESCRIPTION OF THE DRAWINGS

A more complete appreciation of the disclosure and many of the advantages and features thereof can readily be obtained and understood from the following detailed description with reference to the accompanying drawings, wherein:

FIG. 16 is an exemplary matrix for a spot noise elimination process according to an embodiment of the present invention.

DETAILED DESCRIPTION OF THE EMBODIMENTS

Figure 1:
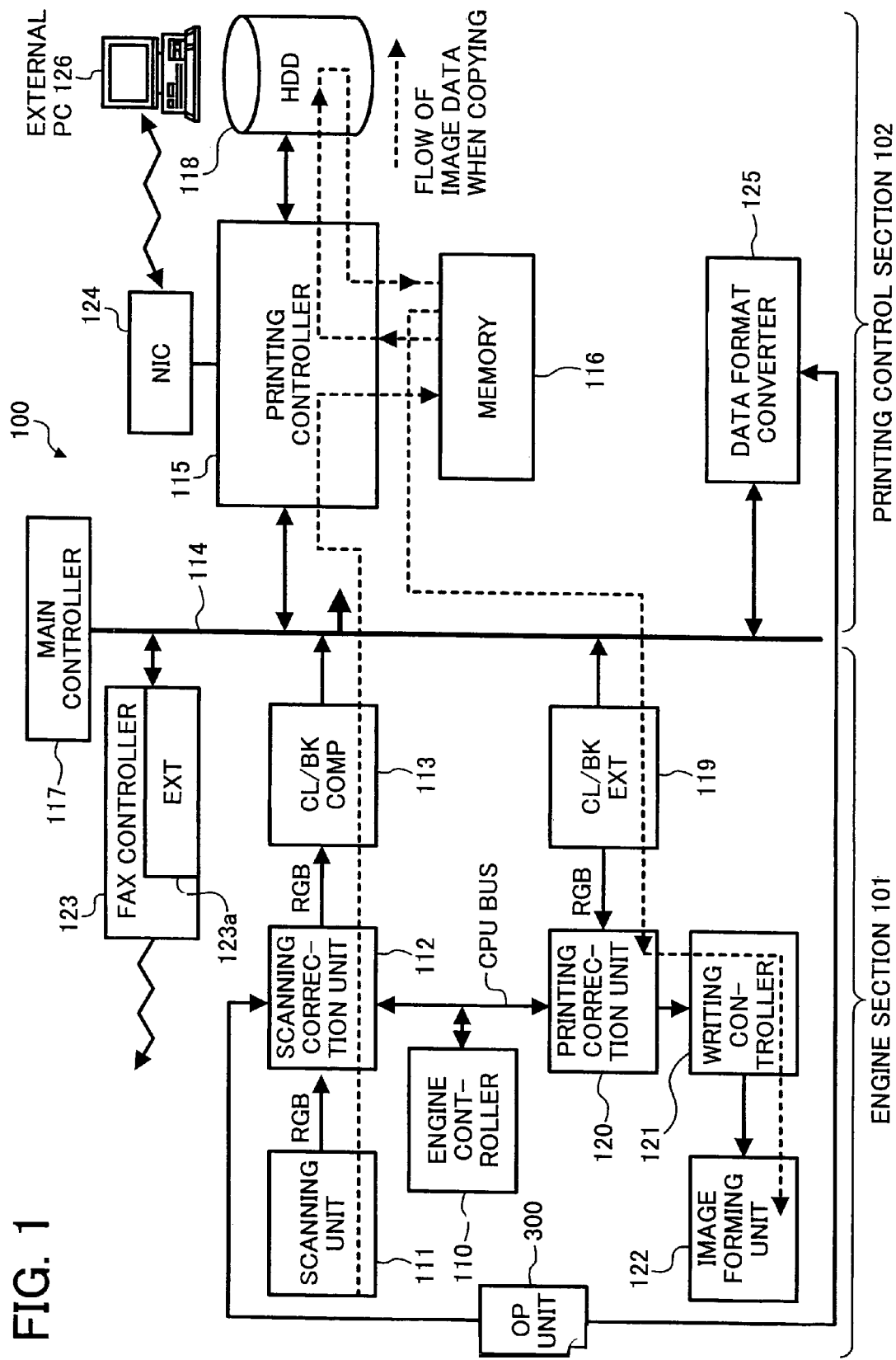
FIG. 1 is an exemplary block diagram illustrating an image processing apparatus according to an embodiment of the present invention.

In describing exemplary embodiments illustrated in the drawings, specific terminology is employed for clarity. However, the disclosure of this present invention is not intended to be limited to the specific terminology so selected and it is to be understood that each specific element includes all technical equivalents that operate in a similar manner.

Referring now to the drawings, wherein like reference numerals designate identical or corresponding parts throughout the figures, FIG. 1 illustrates an exemplary block diagram of an image processing apparatus according to an exemplary embodiment of the present invention.

FIG. 1 shows an image processing apparatus 100 used as a multi-functional apparatus. For example, the apparatus 100 may provide both copying and printing functions.

Each section of the image processing apparatus 100 and a series of copying steps are now described. Arrow marks indicated in FIG. 1 show a flow direction of image data, but are not intended to be limiting.

As illustrated in FIG. 1, the image processing apparatus 100 includes two sections: an engine section 101, and a printing control section 102.

The engine section 101 includes an engine controller 110, a scanning unit 111, a scanning correction unit 112, a CL/BK COMP 113, a CL/BK EXT 119, a printing correction unit 120, a writing controller 121, an image forming unit 122, and a FAX controller 123 having an EXT 123*a*.

The printing control section 102 includes a printing controller 115, a memory 116, a HDD (hard disk) 118, Network Interface Controller (NIC) 124, and a data format converter 125.

A main controller 117, having a microcomputer, controls the operation of the image processing apparatus 100.

A main bus 114, connecting the engine section 101, the printing control section 102, and the main controller 117, is provided for the image processing apparatus 100.

An external PC (personal computer) 126 is coupled to the image processing apparatus 100 via the NIC 124. The engine controller 110 controls the engine section 101.

The scanning unit 111 scans an original document image creating image signals composed of primary colors of R, G, and B (red, green, and blue) and transmits the image signals to the scanning correction unit 112.

Figure 2:
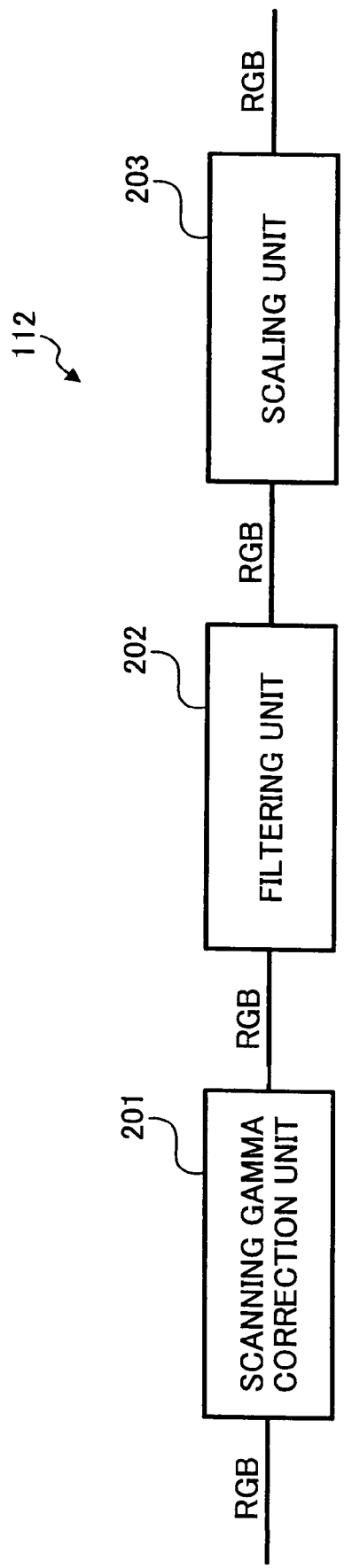
FIG. 2 is an exemplary block diagram illustrating a scanning correction unit according to an embodiment of the present invention.

As show in FIG. 2, the scanning correction unit 112 conducts scanning gamma processing at a scanning gamma correction unit 201, filtering at filtering unit 202, and scaling at scaling unit 203 to the image signals composed of primary colors R, G, and B. These processes are conducted according to predetermined process mode information.

Figure 3:
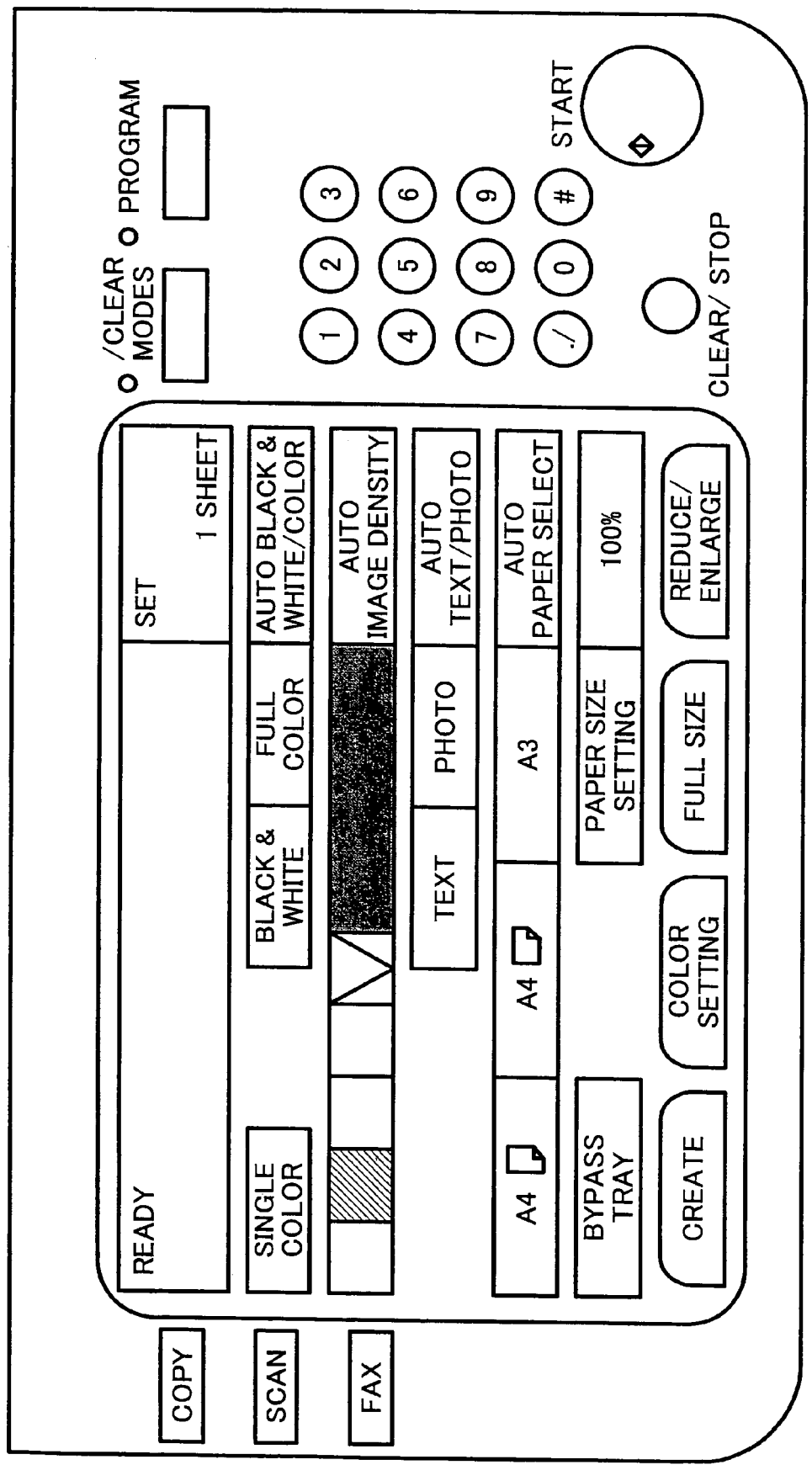
FIG. 3 is an exemplary operation unit provided to an image processing apparatus according to an embodiment of the present invention.

In one exemplary embodiment, a user can set process mode information by inputting information into an operation unit 300 (see FIG. 3) in the casing (not shown) of the image processing apparatus 100.

Hereinafter, the process mode information according to an exemplary embodiment of the present invention includes the application and image quality modes. The process mode information, and the application and image quality modes have equivalent meanings throughout the specification.

The application mode includes "copy," "scan," and "FAX" modes. The image quality mode includes "character," "character-photo," "photo modes," and "notch information." The notch information density information of the scanned original document, by which a user can designate the preferred density.

Each of R, G, and B 8 bit image signals is processed by the scanning correction unit 112, and compressed to n-bit data (wherein "n" is 8 or less) by the CL/BK COMP 113. CL/BK COMP 113 compresses color/monochrome multi-value data with a fixed-length. The CL/BK COMP 113 may also be a general compressor.

The compressed image data is transmitted to the printing controller 115 via the main bus 114.

As shown in FIG. 1, the image data flows in the direction shown by the dotted lines and the data receives the appropriate data processing when passing through the printing controller 115.

The printing controller 115 is connected to memory 116 that stores the image data. The memory 116 includes a semiconductor memory that can be used as working memory. The memory 116 stores image data that is controlled and transmitted by the main controller 117. The HDD 118 stores image data stored in the memory 116 and process mode information input from the operation unit 300.

When the image data is read out from the HDD 118 for plotting an image by the image forming unit 122, the image data is transmitted to the memory 116 from the HDD 118. The memory 116 functions as a kind of buffer memory so that the image data transmission from the HDD 118 to the image forming unit 122 can be conducted without transmission errors. If the memory 116 is not provided, as in FIGS. 1 and 5, a transmission error may occur due to a difference between the data writing speed and the data reading speed of the HDD 118 during operations such as scanning, plotting, transmitting, or the like.

The above described configuration eliminates the need for re-scanning the original document should the user encounter printing problems (e.g., paper jam).

Furthermore, electronic sorting can be conducted. Electronic sorting allows for an image processing apparatus. (e.g., a copier) to automatically collate multiple sets of copies in page order.

In addition, an image processing apparatus may enable re-outputting of image data, by storing a scanned document image as image data.

As illustrated in FIG. 1, when outputting image data, the image data stored in the HDD 118 is transmitted to the memory 116 connected to the printing controller 115, and then it is transmitted to the CL/BK EXT 119 of the engine section 101 via the main bus 114. The CL/BK EXT 119 may also be a general extension unit.

The CL/BK EXT 119, functioning as an extension unit (i.e., uncompressed) for extending color/monochrome multi-value data with fixed-length, converts the image data to 8-bit R, G, and B image data. The converted image data (i.e., R, G, and B image data) is transmitted to the printing correction unit 120.

Figure 4:
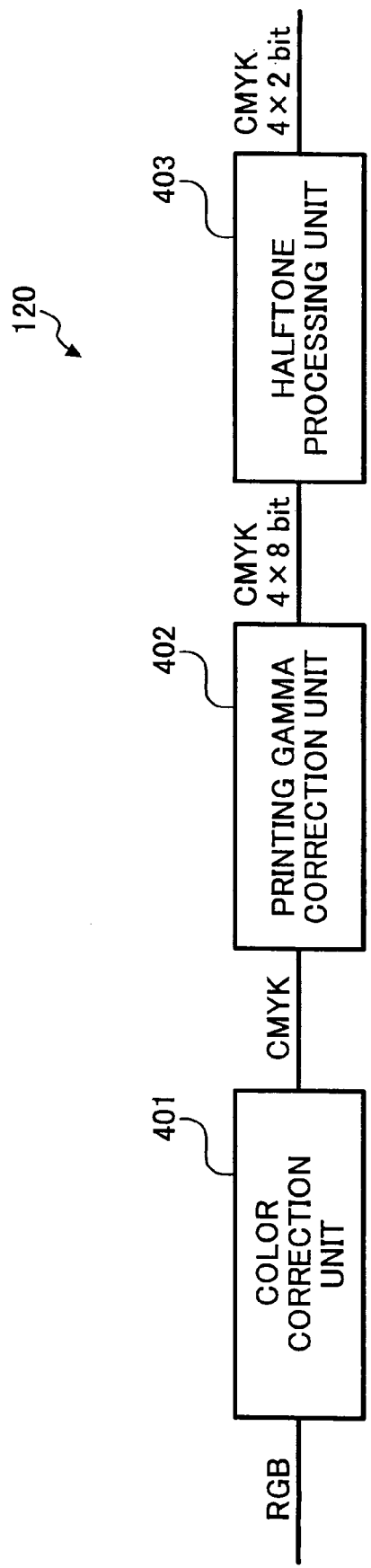
FIG. 4 is an exemplary block diagram illustrating a configuration for a printing correction unit according to an embodiment of the present invention.

As shown in FIG. 4, the printing correction unit 120 includes a color correction unit 401, a printing gamma correction unit 402, and a halftone processing unit 403.

The color correction unit 401 converts the R, G, and B image data to color signals composed of C, M, Y, and K (cyan, magenta, yellow, and black) and transmits the C, M, Y, and K signals to the printing gamma correction unit 402.

The printing gamma correction unit 402 conducts printing gamma correction for the C, M, Y, and K signals and transmits the C, M, Y, and K signals to the halftone processing unit 403.

The halftone processing unit 403 conducts halftone processing for each of C, M, Y, and K signals so that color signals can be used by the image forming unit 122.

Each of the C, M, Y, and K signals is transmitted to the image forming unit 122, and output as a print image on a transfer sheet (not shown).

The above-described processes are conducted based on process mode information stored in the HDD 118.

The image forming unit 122 can employ a plurality of printing methods including electro-photography method, ink-jet method, thermal dye sublimation printing method, silver-photography method, direct thermal recording method, and phase change printing method.

The FAX controller 123 facsimile function of the image processing apparatus 100, and communicates image data with a predetermined network including (i.e., a telephone line). The EXT 123a of the FAX controller 123 conducts compression and extension of to be communicated data.

Figure 5:
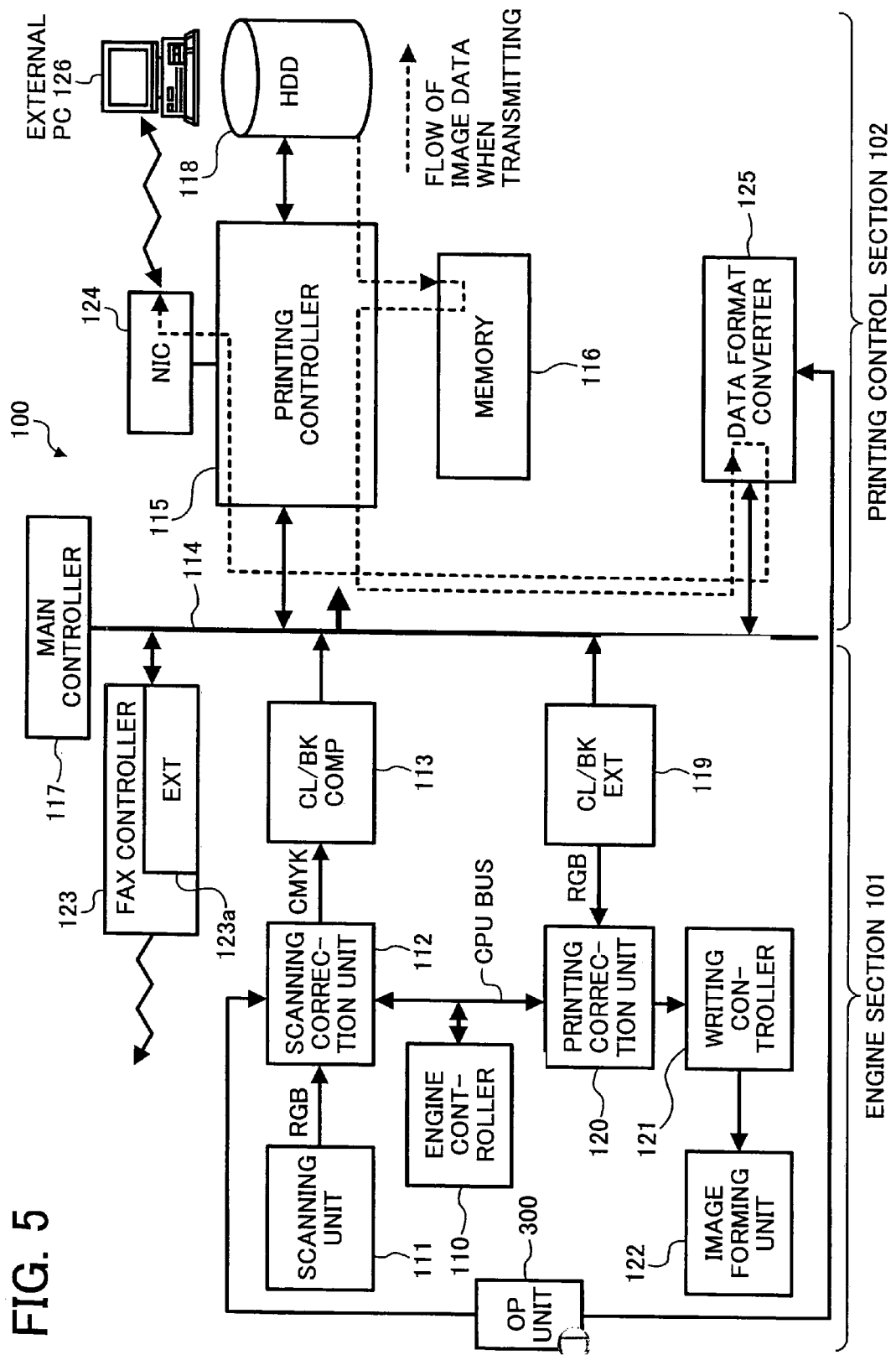
FIG. 5 is an exemplary block diagram illustrating a transmission of image data stored in a hard disk of an image processing apparatus to an external apparatus according to an embodiment of the present invention.

FIG. 5 shows an exemplary embodiment in which monochrome image data stored in the HDD 118 is transmitted to the external PC 126. Although not shown in FIG. 5, color image data can be similarly transmitted to the external PC 126.

The NIC 124 is an interface that couples the image processing apparatus 100 to a network (e.g., LAN (local area network)). The data format converter 125 will be described later.

As above mentioned, the HDD 118 stores image data and process mode information, wherein the process mode information is input from the operation unit 300.

As illustrated in FIG. 5, the image data stored in the HDD 118 is transmitted to the memory 116 connected to the printing controller 115 at once, and then transmitted to the data format converter 125 via the main bus 114. During the transmission, the process mode information is transmitted with the image data to the data format converter 125.

The data format converter 125 processes the image data according to the process mode information.

The data format converter 125 conducts the appropriate data format processing to the image data so that the image data can be used for transmission purposes, and transmits the processed image data to the external PC 126 via the NIC 124.

The external PC 126 can make an image data acquisition request to the image processing apparatus 100, and can also designate process mode information for the requested image data. The main controller 117 detects the process mode information transmitted from the external PC 126, and transmits the process mode information to the data format converter 125.

The data format converter 125 converts the data format of the requested image data to another data format according to the process mode information designated by the external PC 126.

In the description that follows, HDD 118 stores image data compressed in RGB color space for copying purposes.

The image data for copying purposes is generated by scanning an image with an apparatus (e.g., a color copier) having a color space, and storing the image data in the HDD 118.

The color space may be a color space of YUV (luminance, blue, red) or CMY (cyan, magenta, yellow), depending on the type (i.e., characteristic) of apparatus. Alternatively, the color space may be a color space of sRGB (standard RGB), regardless of the apparatus type.

When transmitting color space signals to another apparatus via a network, the color space signals are corrected so that color space signals can be used by another apparatus.

Color spaces that can be used among a plurality of apparatuses include sRGB color space, CIE LAB color space, and a specific color space shared among different apparatuses.

Hereinafter, the data format converter 125 is explained in detail with reference to FIG. 6.

Figure 6:
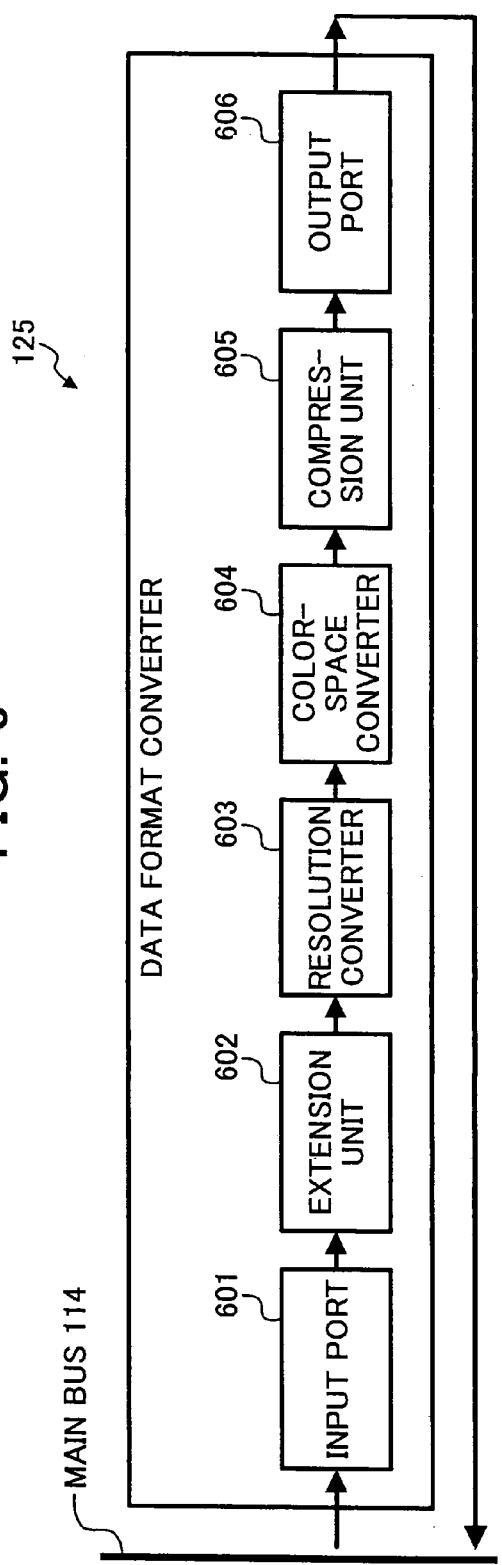
FIG. 6 is an exemplary block diagram illustrating a data format converter provided to an image processing apparatus according to an embodiment of the present invention.

As shown in FIG. 6, the data format converter 125 includes an input port 601, an extension unit 602, a resolution converter 603, a color space converter 604, a compression unit 605, and an output port 606.

The input port 601 receives image data and process mode information stored in the HDD 118 via the main bus 114, and transmits the image data to the extension unit 602.

The extension unit 602 extends (i.e., uncompresses) the compressed image data, and transmits the extended image data to the resolution converter 603.

The resolution converter 603 converts the resolution level of the extended image data to another resolution level according to the process mode information, and transmits the converted image data to the color space converter 604.

The color space converter 604 converts the color space of the converted image data to another color space according to the process mode information, and transmits the converted image data to the compression unit 605.

The compression unit 605 encodes and compresses the image data with a predetermined compression and encoding format, and transmits the compressed image data to the output port 606.

The compressed image data is transmitted from the output port 606 to the main bus 114, and is further transmitted to an external apparatus (e.g., external PC 126).

With such processing, image data having a first data format stored in the HDD 118 is converted to image data having a second data format, and is output to the main bus 114.

Hereinafter, the data format conversion process conducted by the data format converter 125 is explained with reference to FIGS. 7-9.

Figure 7:
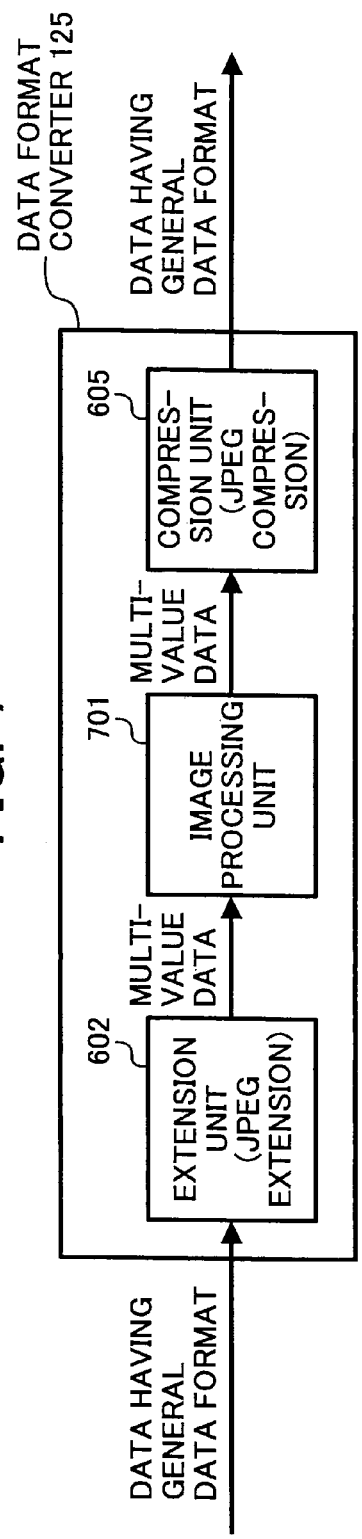
FIG. 7 is an exemplary block diagram illustrating a data format conversion by a data format converter according to an embodiment of the present invention.
Figure 8:
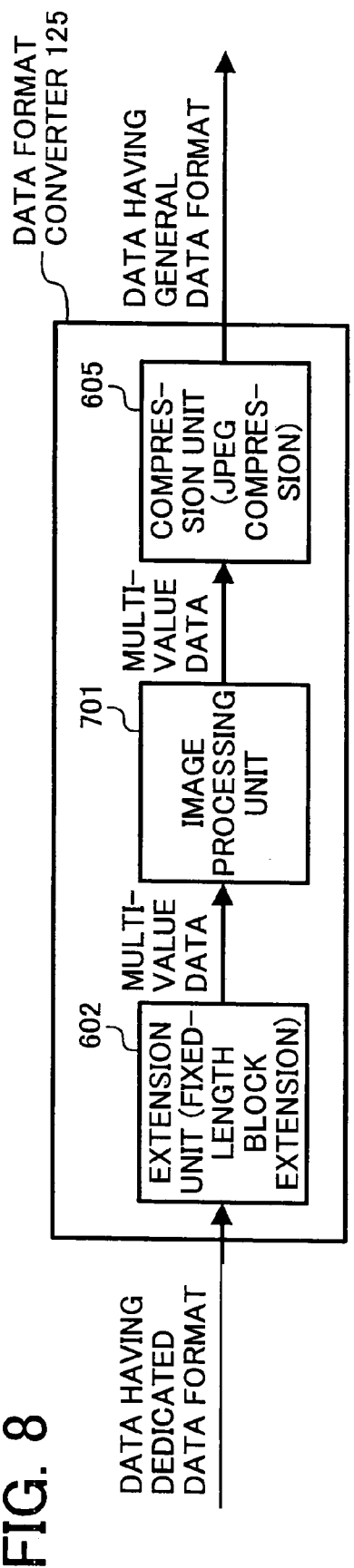
FIG. 8 is an exemplary block diagram illustrating data format conversion by another data format converter according to an embodiment of the present invention.
Figure 9:
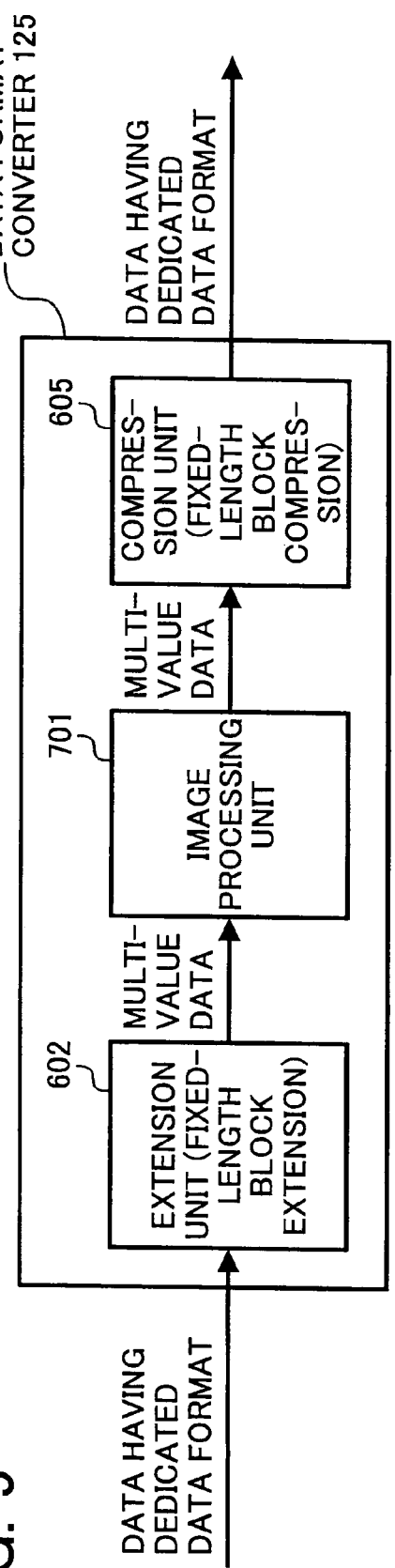
FIG. 9 is an exemplary block diagram illustrating data format conversion by another data format converter according to an embodiment of the present invention.

The data format converter 125 in FIGS. 7-9 includes extension unit 602, image processing unit 701, and compression unit 605, wherein the image processing unit 701 includes the resolution converter 603 and the color space converter 604 which are shown in FIG. 6.

In FIGS. 7-9, the input port 601 and the output port 606 is omitted from the drawings.

As shown in FIGS. 7-9, the data format converter 125 receives multi-value image data having a first data format, and outputs multi-value image data having a second data format. The first data format may be either a general data format or a data format dedicated to an image processing apparatus, and the second data format includes a general data format and a data format dedicated to an image processing apparatus.

As such, the extension unit 602 extends (i.e., uncompresses) image data having a first data format, and the compression unit 605 compresses image data having a second data format as shown in FIGS. 7-9.

As shown in FIG. 7, the data format converter 125 receives multi-value image data compressed into a general data format (e.g., JPEG).

The extension unit 602 extends (i.e., restores) such multi-value image data and transmits the extended multi-value image data to the image processing unit 701.

The image processing unit 701 conducts image processing on the multi-value image data according to the process mode information and transmits the multi-value image data to the compression unit 605.

The compression unit 605 conducts JPEG compression, for example, the multi-value image data, and outputs the multi-value image data, in a general data format (i.e., JPEG), to an external unit.

Although the data format converter 125 shown in FIG. 7 employs JPEG as the general data format in this example, the data format converter 125 can employ other general data formats that can be used by personal computers (e.g., TIFF, JPEG 2000).

As such, by conducting data communication using a general data format, such as JPEG, data can be communicated among a plurality of units with the same data format (i.e., general data format).

Furthermore, a data format converting system capable of maintaining both data quality and data communication efficiency can be established by employing a general data format.

In addition, when image data is expressed as binary data, such image data can be compressed and extended by a general format such as the MHMR/MMR (modified huffman modified read/modified modified read) method.

FIG. 8 illustrates an exemplary implementation in which the data format converter 125 receives image data compressed by a data format dedicated to the image processing apparatus 100, and outputs the image data having a general data format, wherein the general data format is similar to the general data format described in the example illustrated in FIG. 7.

Such dedicated data format is a special data format, which is unique to the image processing apparatus 100, but is not a general data format (e.g., JPEG, JPEG 2000) that can be used on any personal computer.

Therefore, the extension unit 602 employs a fixed-length block extension method dedicated to the image processing apparatus 100, which maintains compression efficiency and data processing efficiency, as an extension method for image data having a data format dedicated to the image processing apparatus 100.

The compression unit 605 employs a compression method using a general data format, which is similar to the example illustrated in FIG. 7.

As shown in FIG. 8, the data format converter 125 receives image data compressed with fixed-length block.

The extension unit 602 extends (i.e., restores) the image data to multi-value image data, and transmits the multi-value image data to the image processing unit 701.

The image processing unit 701 processes the multi-value image data according to the process mode information and transmits the multi-value image data to the compression unit 605.

The compression unit 605 compresses (e.g., JPEG)the multi-value image data, and outputs the multi-value image data having a general data format (i.e., JPEG) to an external unit.

As shown in FIG. 8, the data format converter 125 receives image data compressed by a fixed-length block compression method dedicated to the image processing apparatus. Therefore, the variation of the compression rate can be controlled to a fixed level.

Furthermore, data processing, such as image direction rotation and image sorting, can be readily conducted because the image data is processed as a block.

By using a general data format, such as JPEG, for image data communication, a plurality of units can communicate data with each other using the same general data format.

Furthermore, a data format converting system, capable of maintaining both data quality and data communication efficiency, can be established by using a general data format.

In addition, when image data is expressed as binary data, the compression unit 605 can compress image data using a standard compression and extension data format (e.g., MHMR/MMR method).

Another example is illustrated in FIG. 9. The data format converter 125 receives image data compressed to a data format dedicated to the image processing apparatus 100 and outputs the image data with the dedicated data format.

Therefore, the compression unit 605 compresses the image data with fixed-length block compression method of the dedicated data format.

As shown in FIG. 9, the data format converter 125 receives the image data compressed by the fixed-length block compression method dedicated to the image processing apparatus. Therefore, the variation of the compression rate of the image data can be controlled to a fixed level.

Furthermore, data processing, such as image direction rotation and image sorting, can be readily conducted because the image data is processed as a block.

Hereinafter, the resolution converter 603 is explained with reference to FIGS. 10A-10C.

Figure 10A:
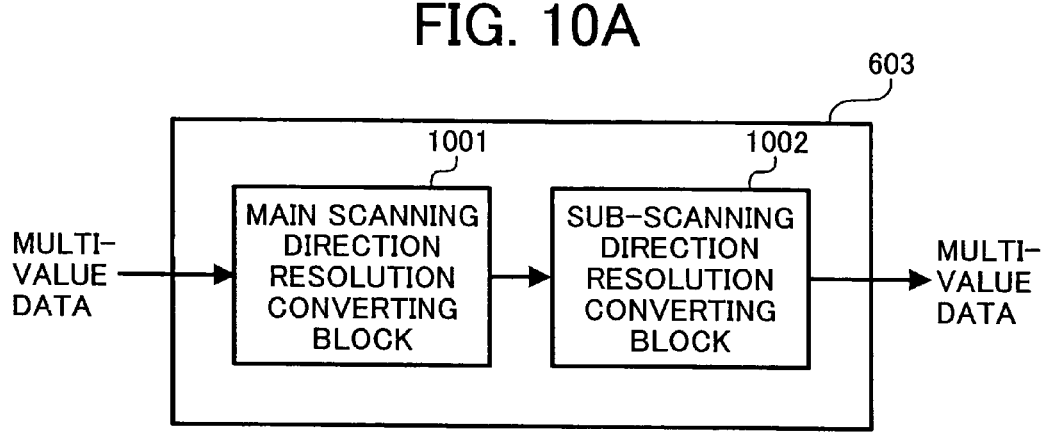
FIG. 10A is an exemplary block diagram illustrating a resolution converter according to an exemplary embodiment of the present invention.
Figure 10B:
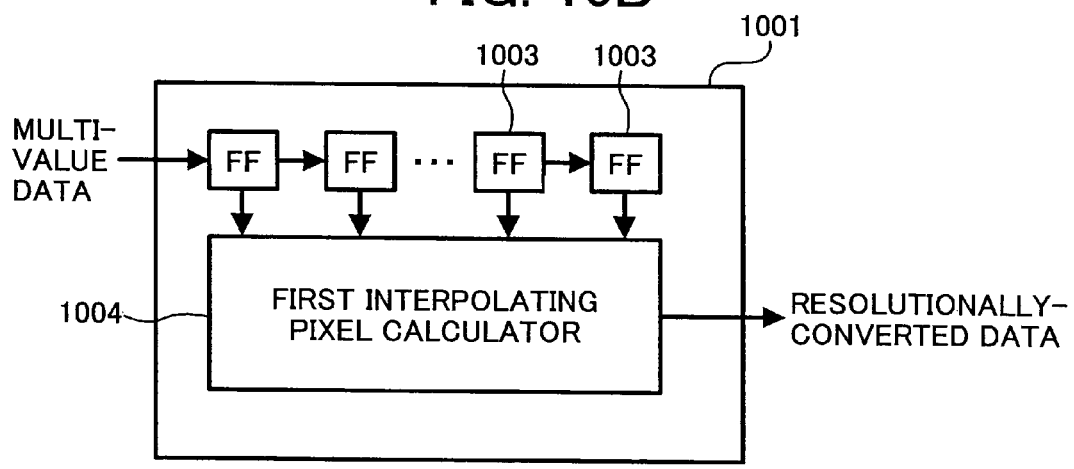
FIG. 10B is an exemplary block diagram illustrating a resolution converting block for main scanning direction according to an embodiment of the present invention.
Figure 10C:
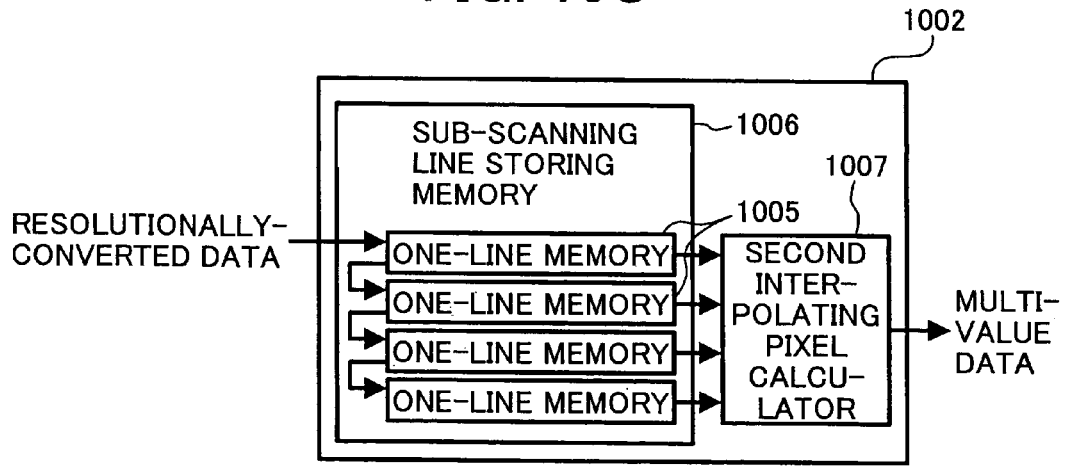
FIG. 10C is an exemplary block diagram illustrating a resolution converting block for sub-scanning direction according to an exemplary embodiment of the present invention.

The exemplary embodiments shown in FIGS. 10A-10C relate to multi-value pixel data, and illustrate a method for converting image data to any discretionary designated resolution in both a main scanning direction and a sub-scanning direction.

As shown in FIG. 10A, the resolution converter 603 includes a main scanning direction resolution converting block 1001 and a sub-scanning direction resolution converting block 1002.

As shown in FIG. 10B, the main scanning direction resolution converting block 1001 includes a plurality of flip-flops (FFs) 1003 and a first interpolating pixel calculator 1004.

As shown in FIG. 10B, the main scanning direction resolution converting block 1001 receives multi-value image data and conducts pixel interpolation in a main scanning direction to convert the resolution of the received multi-value image data to another resolution. The external PC 126 can conduct such designation, for example.

For example, image data having 600 dpi resolution can be converted to the image data having 100 dpi resolution.

The values of the pixel data can be calculated by a general method such as nearest neighbor pixel substitution method, adjacent two-pixel weighted average method, or three-dimensional convolution function method.

Specifically, the plurality of flip-flops (FFs) 1003, capable of latching each one bit of data, memorize pixel data, and the first interpolating pixel calculator 1004 calculates data-value to be interpolated.

As shown in FIG. 10C, the sub-scanning direction resolution converting block 1002 includes a plurality of one-line memories 1005, a sub-scanning line storing memory 1006 and a second interpolating pixel calculator 1007.

The main scanning direction resolution converting block 1001 receives multi-value image data and converts the resolution of the multi-value image data in main scanning direction according to the process mode information.

The sub-scanning direction resolution converting block 1002 receives the multi-value image data resolutionally converted in main scanning direction and converts the resolution of the multi-value image data in a sub-scanning direction.

As shown in FIG. 10C, the sub-scanning direction resolution converting block 1002 receives the multi-value image data, which is resolutionally converted in a main scanning direction.

Each of the one-line memories 1005, of the sub-scanning line storing memory 1006, can store one line of data converted in a main scanning direction.

The second interpolating pixel calculator 1007 receives the image data from the each of the one-line memories 1005, and calculates the data value of the lines to be interpolated based on reference pixel data in a sub-scanning direction.

Values of the pixel data can be calculated by a general method. For example, nearest neighbor pixel substitution method, adjacent two-pixel weighted average method, or three-dimensional convolution function method can be used to calculate the pixel values.

Hereinafter, the color space converter 604, having a color space conversion function, is explained with reference to FIG. 11.

Figure 11:
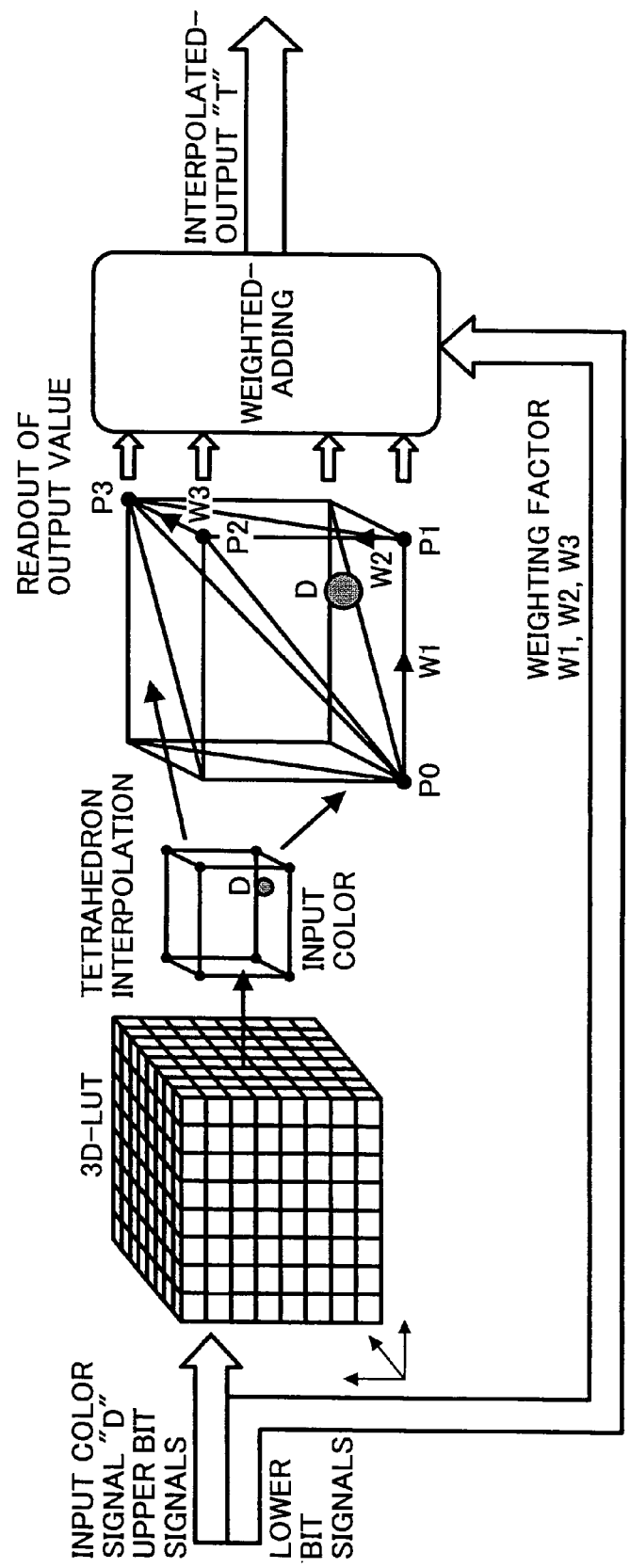
FIG. 11 is a schematic view illustrating a color-space conversion by a color-space converter according to an embodiment of the present invention.

FIG. 11 illustrates a color space conversion using a table interpolation method.

As illustrated in FIG. 11, a predetermined three-dimensional LUT (look-up table) is used for the table interpolation method, wherein the LUT is divided into eight sections in each of the x-axis, y-axis, and z-axis directions.

An input color signal "D" is divided into upper bits and lower bits. The upper bits of the color signal "D" are used to refer to the LUT, and the lower bits of the color signal "D" are used in the three-dimensional interpolation to obtain a precise interpolated output "T."

Although the three-dimensional interpolation method can be conducted by a plurality of methods, "tetrahedron interpolation method," one of the simplest three-dimensional interpolation methods, is explained herein as an example.

As illustrated in FIG. 11, a color space of the color signal "D" is divided into a plurality of unit cubes, wherein the color space is divided into eight sections in each of the x-axis, y-axis, and z-axis directions.

Furthermore, one unit cube is divided into six tetrahedrons by dividing the unit cubic.

If a unit cube contains the input color signal "D", the tetrahedron where the input color "D" exists is specified.

Each of P0, P1, P2, and P3 shown in FIG. 11, represent a lattice point of the tetrahedron.

The weighting factors W1, W2, and W3 are set corresponding to the lower bits of the input color signal "D." The interpolated output "T" for the input color signal "D" is calculated as noted below.

$$(T)=(P0)+W1[(P1)-(P0)]+W2[(P2)-(P0)]+W3[(P3)-(P0)]$$

Each of (P0), (P1), (P2), and (P3) are output values, stored in a color conversion table, for each of the lattice points P0, P1, P2, and P3.

Hereinafter, image data generation and transmission processing in the image processing apparatus 100 according to an exemplary embodiment of the present invention is explained with reference to FIG. 12.

Figure 12:
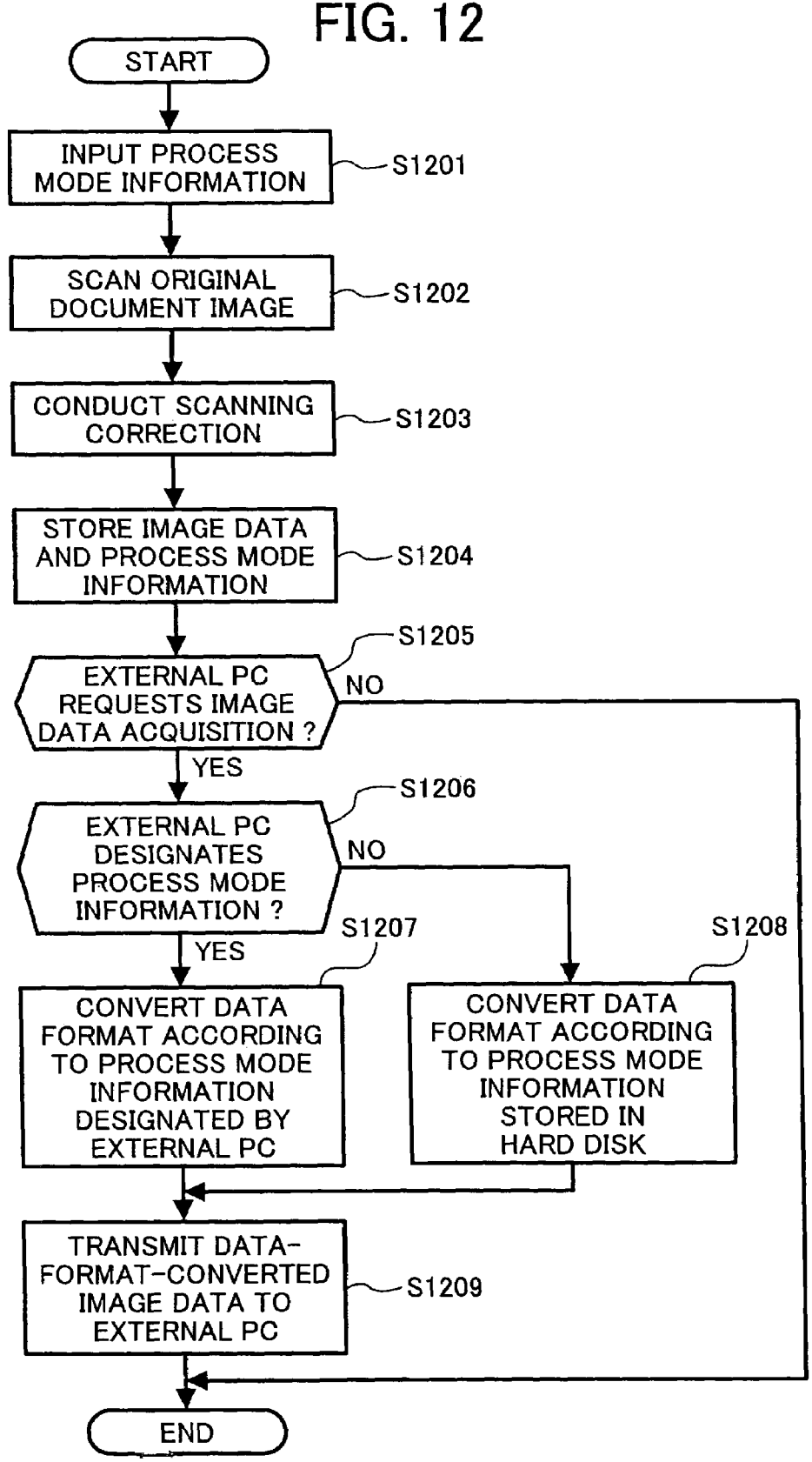
FIG. 12 is a flow chart illustrating the steps for image data generation and transmission according to an embodiment of the present invention.

FIG. 12 is a flow chart illustrating the steps of image data generation and transmission.

In step S1201, process mode information for to be generated image data is input from the operation unit 300 of the image processing apparatus 100.

Such process mode information includes "image quality mode." Specifically, "image quality mode" includes character mode, character-photo mode, photo mode, and notch information. The notch information includes density information of the scanned original document. The user can designate the preferred density using the notch information.

In step S1202, the scanning unit 111 scans an original document image.

In step S1203, the scanning correction unit 112 conducts a scanning correction process to the scanned image data. The scanning correction process may include scanning, gamma-processing, filtering, and scaling, for example, and is conducted in accordance with the predetermined process mode information set in step S1201.

In step S1204, the image data, and the predetermined process mode information are stored in the HDD 118.

In step S1205, the main controller 117 determines whether the external PC 126 requests acquisition of image data.

If the main controller 117 determines that there is no request for acquisition of image data, the process proceeds to "END."

If the main controller 117 determines that there is a request for acquisition of image data, the main controller 117 determines whether the external PC 126 designated process mode information for acquisition-requested image data in step S1206.

If the main controller 117 determines that the external PC 126 designated the process mode information for the acquisition requested image data, the process proceeds to step S1207.

If the main controller 117 determines that the external PC 126 did not designate process mode information for acquisition requested image data, the process proceeds to step S1208.

In step S1207, the data format converter 125 converts the data format of the image data read out from the HDD 118 to another data format according to the process mode information designated by the external PC 126, and transmits the converted image data to the external PC 126 in step S1209.

In step S1208, the data format converter 125 converts a data format of the image data read out from the HDD 118 to another data format according to process mode information stored in the HDD 118 in step S1201, and transmits the converted image data to the external PC 126 in step S1209.

When the image data is stored in or read out from the HDD 118, predetermined compression or extension processes are conducted on the image data.

Hereinafter, processing of the image data by the data format converter 125 is explained with reference to FIG. 13.

FIG. 12 illustrates steps for image data format conversion depending on whether the processing is done in accordance with process mode information designation from the external PC 126, however, a similar processing is applied in both situations. Accordingly, one exemplary image data format conversion process, conducted by the data format converter 125, is explained with reference to FIG. 13.

Figure 13:
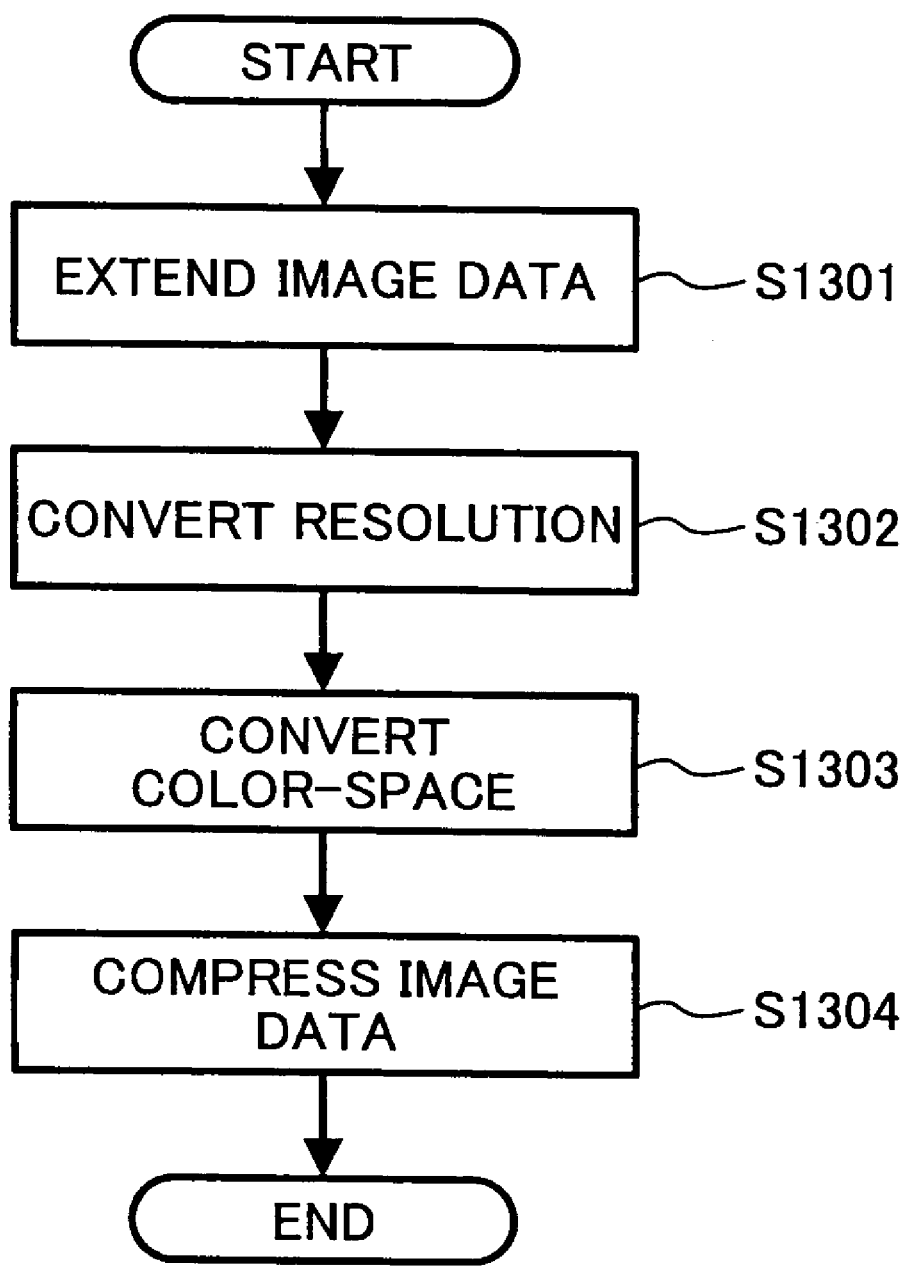
FIG. 13 is a flow chart illustrating steps for image data format conversion according to an embodiment of the present invention.

FIG. 13 is a flow chart illustrating image data format conversion processing in the data format converter 125.

In step S1301, the extension unit 602 extends the image data read out from the HDD 118 to restore the image data to non-compressed data.

In step S1302, the resolution converter 603 conducts a resolution converting process to the extended multi-value image data.

In step S1303, the color space converter 604 conducts a color space conversion process to the image data.

In step S1304, the compression unit 605 compresses the image data before transmitting the image data to an external unit.

If the external PC 126 designates process mode information for the acquisition of requested image data, steps S1302 and S1303 are conducted according to the process mode information.

If the external PC 126 does not designate process mode information for the acquisition of requested image data, steps S1302 and S1303 are conducted according to process mode information input from the operation unit 300, which is stored in the HDD 118.

Furthermore, as above-described, the data format converter 125 can receive image data having a first data format and output the image data in a second data format. The conversion process is mainly conducted in step S1304.

Accordingly, a data format converter 125 that either receives image data having a general data format or having a data format dedicated to the image processing apparatus 100 can output the image data in a general data format.

Furthermore, the data format converter 125 that receives image data having a dedicated data format can also output the image data in the dedicated data format.

The data format of the image data, output from the data format converter 125, can be also determined by process mode information input into the operation unit 300 or process mode information designated by the external PC 126.

With such an arrangement, an original document image scanned by an image processing apparatus can be converted to image data in a general data format, which can be used in a plurality of image processing apparatuses.

When image data is transmitted in a general data format to external apparatuses, the image data can be used by the external apparatuses.

Hereinafter, another exemplary embodiment according to the present invention is explained.

The following exemplary embodiment converts input image data having color characteristics to image data having monochrome characteristics.

Figure 14:
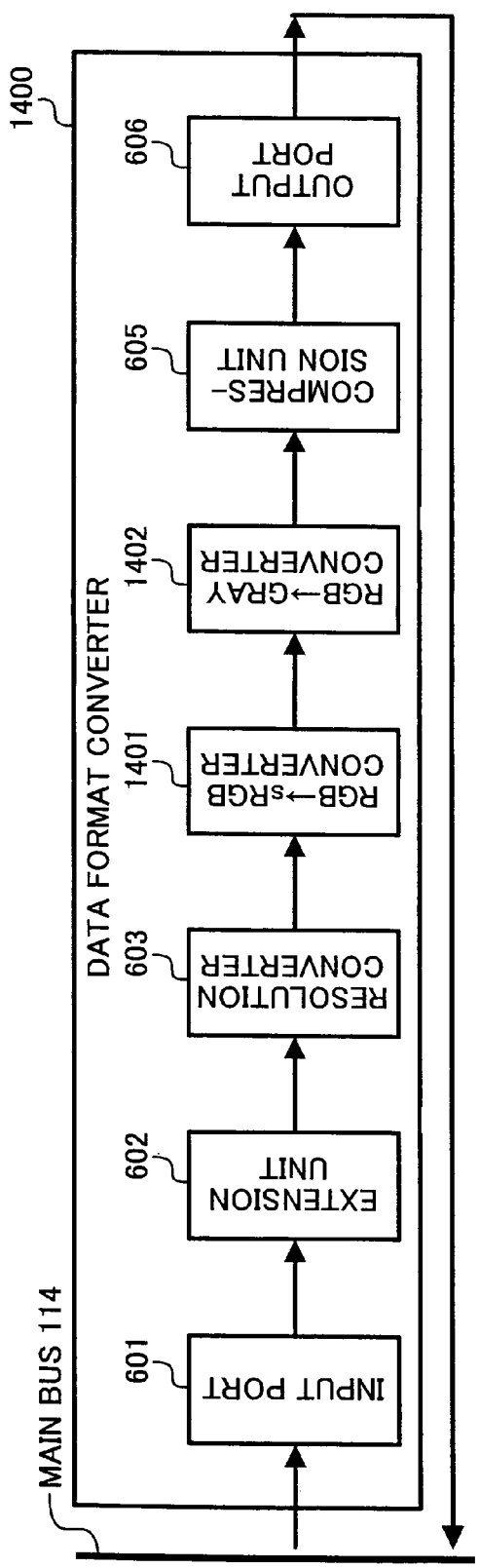
FIG. 14 is a block diagram illustrating a data format converter provided to an image processing apparatus according to an embodiment of the present invention.
Figure 15:
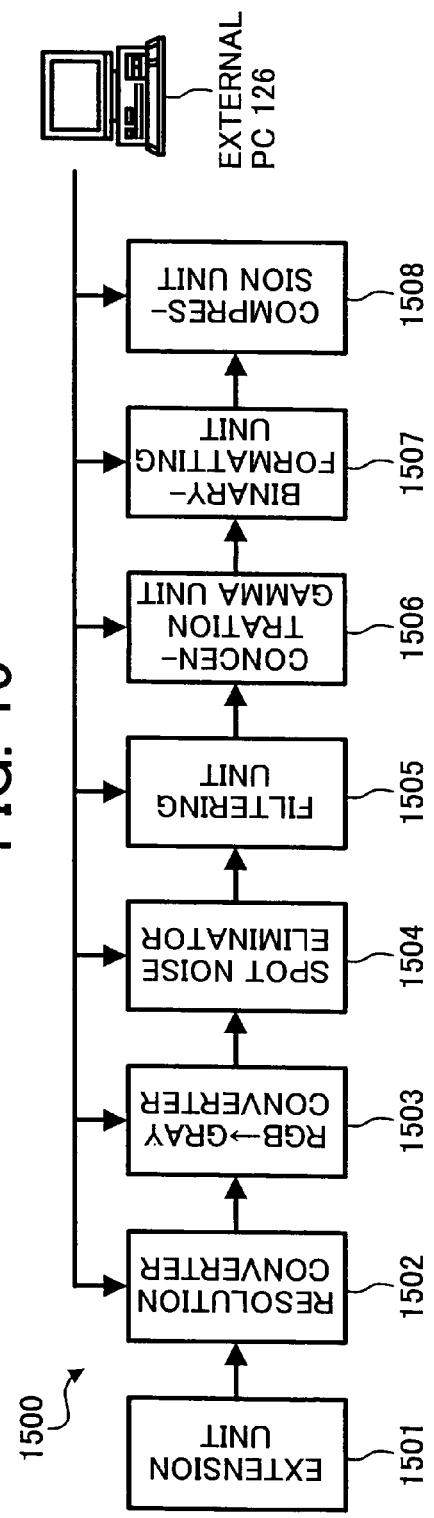
FIG. 15 is an exemplary block diagram illustrating a modified data format converter illustrated in FIG. 14 according to an embodiment of the present invention.

Because an image processing apparatus for the following exemplary embodiment employs a similar configuration as in the image processing apparatus 100 of the above-described exemplary embodiment, only data format converters 1400 and 1500 with reference to FIGS. 14 and 15 are described.

FIG. 14 is a block diagram illustrating a configuration of the data format converter 1400 provided in an image processing apparatus of another exemplary embodiment of the invention.

As shown in FIG. 14, the data format converter 1400 includes input port 601, extension unit 602, resolution converter 603, RGB->sRGB converter 1401, RGB->Gray converter 1402, compression unit 605, and output port 606.

The input port 601 receives compressed image data and process mode information, stored in the HDD 118, via the main bus 114 and transmits the image data to the extension unit 602.

The extension unit 602 extends (i.e., uncompresses) the compressed image data and transmits the extended image data to the resolution converter 603.

The resolution converter 603 converts the resolution level of the image data according to the process mode information and transmits the converted image data to the RGB->sRGB converter 1401.

If the input image data is RGB image data, which is unique to the image processing apparatus, the RGB->sRGB converter 1401 converts the RGB image data to a standard color space such as sRGB and transmits the sRGB image data to the RGB->Gray converter 1402.

The RGB->Gray converter 1402 converts the sRGB image data to monochrome image data and transmits the monochrome image data to the compression unit 605.

The compression unit 605 compresses and encodes the monochrome image data with a predetermined data compression and encoding format and transmits the compressed monochrome image data to the output port 606.

The compressed monochrome image data is transmitted from the output port 606 to the main bus 114 and then to an external apparatus (e.g., external PC 126).

Image data, stored in the HDD 118 having a first data format is converted to image data having a second data format and the converted image data is output to an external unit.

In the above-described exemplary embodiment, RGB image data, which is unique to the image processing apparatus, is first converted to sRGB image data, and then the image data is converted to monochrome image data. Thus, monochrome image data conforming to a standard color space is obtained.

The input port 601, extension unit 602, resolution converter 603, compression unit 605 and output port 606 are similar to those described above.

Hereinafter, another data format converter modifying the data format converter 1400 is explained with reference to FIG. 15.

FIG. 15 illustrates a modified data format converter of the converter illustrated in FIG. 14.

In FIG. 15, the above-mentioned input port 601 and output port 606 are omitted from the drawing.

The data format converter 1500 includes extension unit 1501, resolution converter 1502, RGB->Gray converter 1503, spot noise eliminator 1504, filtering unit 1505, concentration gamma unit 1506, binary-formatting unit 1507 and compression unit 1508.

Assume that the compressed image data stored in the HDD 118 is image data of a predetermined color space. In other words, the image data is compressed with a fixed-length multi-value compression method for each R, G, and B image signal.

The extension unit 1501 extends (i.e., uncompresses) the compressed RGB image data and transmits the extended image data to the resolution converter 1502.

The resolution converter 1502 converts the resolution of the extended image data using a predetermined scaling ratio, and transmits the converted RGB image data to the RGB->Gray converter 1503.

The RGB->Gray converter 1503 converts RGB image data to monochrome image data and transmits the monochrome image data to the spot noise eliminator 1504.

The spot noise eliminator 1504 detects and eliminates a spot noise of the monochrome multi-value image data using a spot noise detection algorithm and transits the monochrome image data to the filtering unit 1505.

The filtering unit 1505 conducts emphasizing and smoothing processes to the monochrome image data according to process mode information input from the operation unit 300 or designated by the external PC 126. After the emphasizing and smoothing processing is finished, the monochrome image data is transmitted to the concentration gamma unit 1506.

The concentration gamma unit 1506 adjusts the concentration level of the image data and transmits the monochrome image data to the binary-formatting unit 1507.

The binary-formatting unit 1507 conducts binary-formatting of the monochrome image data using a predetermined method and transmits the binary formatted monochrome image data to the compression unit 1508.

The compression unit 1508 compresses the monochrome image data using a general data compression method (e.g., MHMR/MMR method).

By applying the above-described configuration to the data format converter 1500, color image data can be converted to monochrome binary image data, and the external PC 126 can receive the monochrome binary image data.

The above described configuration is useful when a user wants to receive monochrome binary image data instead of color image data at the external PC 126 due to the smaller burden the monochrome data will place on the external PC.

Therefore, the above-described exemplary embodiment accommodates a user requesting a smaller data size.

Hereinafter, each block of the data format converter 1500, illustrated in FIG. 15, is described.

The extension unit 1501, resolution converter 1502, RGB->Gray converter 1503 and compression unit 1508 are not described because these units function in a similar manner as described above.

First, the process conducted by the spot noise eliminator 1504 is described. If a noise (e.g., a spot) is included in an original document image, an output image produced from such original document image may include an area not aesthetic to human eyes.

When spot noise is present, the spot noise eliminator 1504 removes spot noise with a spot noise elimination algorithm.

The spot noise eliminator 1504 can employ a plurality of spot noise elimination algorithms. For example, the spot noise eliminator 1504 can employ a method using a matrix as illustrated in FIG. 16.

FIG. 16 is an exemplary 5×5 matrix, having 25 blocks as illustrated in the drawing.

In this example, the spot noise eliminator 1504 observers a pixel block "d22." If pixel values for all of the pixel blocks, except the pixel block "d22," are less than a predetermined threshold value of "TH1," for example, the pixel value of the observed pixel block "d22" is changed to "zero." Thereby, the pixel block "d22" is changed to a white pixel. This processing, allows for noise to be removed from the images scanned by the scanning unit 111.

If the image data stored in the HDD 118 is prepared by scanning an image (e.g. a document image), the above-described spot noise elimination method can be used effectively.

If the image data stored in the HDD 118 is prepared from printer RIP (raster image processing) data, for example, which is prepared electronically, the above-described spot noise elimination is not required.

Accordingly, a high quality image can be reproduced by selecting operational parameters for spot noise elimination, as required, according to an image type.

Hereinafter, a process conducted by the filtering unit 1505 is explained.

A user can obtain the desired optimal image by changing the process conditions for the filtering unit 1505 via the external PC 126, which can designate resolution level, or with process mode information input from the operation unit 300.

The filtering process modulates MTF (modulation transfer function) of image data.

If an original image mainly includes text characters, the quality of the image can be improved by emphasizing MTF in the filtering process.

If an original image mainly includes pictures, the quality of the image can be improved by applying smoothing in the filtering process.

Furthermore, the filtering process can be also used to correct image degradation, which occurs as a result of changing the image data resolution.

Accordingly, a high quality image can be produced by selecting filtering parameters corresponding to the type of image data.

Hereinafter, a process conducted by the concentration gamma unit 1506 is explained.

The concentration gamma unit 1506 includes a RAM (random access memory) for a LUT (look-up table).

The gamma converting process changes the image concentration gradient and concentration characteristics.

A user can obtain an output image having a desired concentration level by changing the concentration level setting in the concentration gamma unit 1506. The external PC 126 can designate the concentration level.

When process mode information is input from the operation unit 300, an image can be output with a concentration level according to such process mode information.

Hereinafter, the process conducted by the binary-formatting unit 1507 is described.

The binary-formatting unit 1507 conducts halftone processing to multi-value image data to convert the multi-value image data to image data expressed in binary data format.

Various methods are used for halftone processing including typical methods as simple quantization method, dither method, and error diffusion. The multi-value image data is quantized in one-bit format for convenience of the description that follows.

In the simple quantization method, any given value within a dynamic range of multi-value image data is set as a threshold value, and the image data is quantized in one-bit format.

For example, assume that to be quantized multi-value image data has a dynamic range of 256 (i.e., 0 to 255). The image data is quantized to "0" or "1" using a threshold value set to "128."

In this example, image data having a value of "100" is quantized to "0," and image data having a value of "200" is quantized to "1."

The dither method uses threshold values configured in a matrix to quantize each pixel in one-bit format.

If the threshold values in the matrix are set randomly within the dynamic range of the image data, the halftone concentration can be produced for image data quantized in a one-bit format. Halftone concentration and image resolution are inversely related.

The error diffusion method quantizes multi-value image data to one-bit format with any given threshold value, as in the simple quantization method.

However, in the error diffusion method, quantization error values for nearby pixels already quantized in a raster format are stored in a computer. The error values are added to a pixel to be quantized so that quantization error values for total image data can be minimized.

Accordingly, the binary-formatting unit 1507 can conduct binary format processing to multi-value image data to reduce the amount of data.

In addition, halftone processing methods matched to a user's intention can be selected to produce a high quality image.

A user can obtain an ouput image processed in accordance with the specifications by changing the halftone processing condition at the external PC 126.

When process mode information is input from the operation unit 300, an output image can be produced according to the process mode information which is stored in the HDD 118.

Hereinafter, a process for outputting image data to an external apparatus (e.g., a personal computer) is described with reference to FIG. 17.

Figure 17:
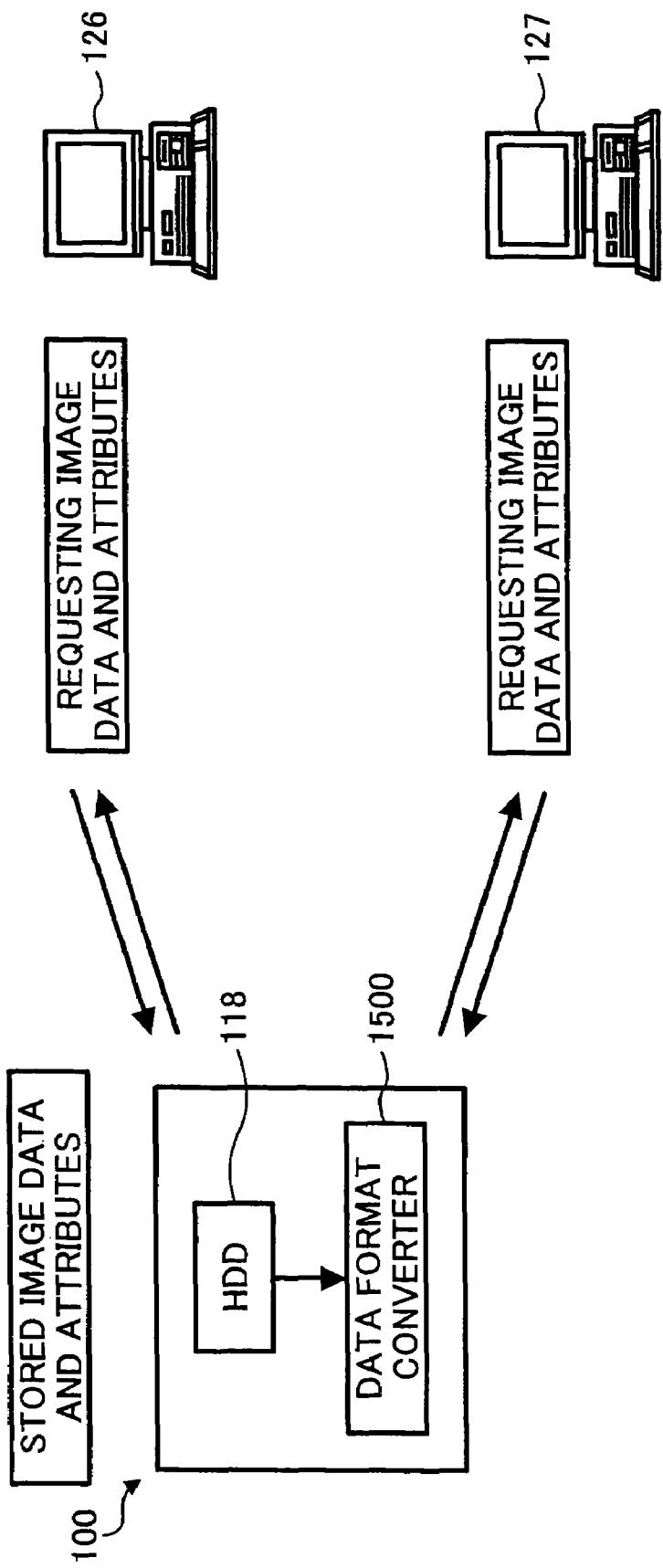
FIG. 17 is a configuration illustrating image data transmission from an image processing apparatus to external personal computers according to an embodiment of the present invention.

As shown in FIG. 17, each of the external PCs 126 and 127 request image data acquisition to the HDD 118 by designating attributes of the requested image data which is stored in the HDD 118.

Based on the attribute information for the image data designated by the external PCs 126 and 127, and process mode information input from the operation unit 300, the image data parameters for the data format converter 1500 are determined.

The parameters for resolution converter 1502, filtering unit 1505, concentration gamma unit 1506, binary-formatting unit 1507, and compression unit 1508 in the data format converter 1500 are changed based on the image data parameters. The processed image data is transmitted to the external PCs 126 and 127.

In the example illustrated in FIG. 17, it is assumed that the HDD 118 of the image processing apparatus 100 stores image data having a certain color space, which is scanned as a color copy image by a color copier.

As shown in FIG. 17, the HDD 118 of the image processing apparatus 100 stores image data having following attributes.

Resolution: 600 dpi (dot per inch)
Color space: RGB
Compression: apparatus-unique block compression
Image quality mode when stored: text character
Scaling when stored: 100%
Concentration notch when stored: 4

The external PC 126 has requested to acquire image data having following attributes.

Resolution: 400 dpi
Color space: Monochrome (multi-value)
Concentration for output: notch 6
Data format: JPEG (joint photographic expert group)

The external PC 127 has requested to acquire image data having following attributes.

Resolution: 300 dpi
Color space: Monochrome (binary)
Concentration for output: notch 4
Data format: TIFF (tagged image data format)

The data format converter 1500 conducts image processing requested by each of the external PCs 126 and 127.

Image data stored in the HDD 118 is compressed as a block by an apparatus unique compression method. The extension unit 1501 extends the image data to non-compressed data.

The resolution converter 1502 determines the resolution converting parameters based on the resolution level requested from each of the external PCs 126 and 127 and the resolution level of the image data stored in the HDD 118.

In this example, a data resolution conversion from 600 dpi to 400 dpi is conducted for the image data requested by the external PC 126, and a data resolution conversion from 600 dpi to 300 dpi is conducted the image data requested by the external PC 127.

The RGB->Gray converter 1503 converts the color space of the image data, to be transmitted to each of the external PCs 126 and 127, from RGB to monochrome.

In an exemplary embodiment of the present invention, a filtering process is conducted when image data is stored in the HDD 118.

However, if degradation of the image data occurs (e.g., pictures and text characters) due to resolution conversion, another filtering process may be conducted, as needed.

In this example, gamma processing is not conducted when image data is stored in the HDD 118.

Therefore, the HDD 118 stores image quality mode and concentration notch as process mode information when the HDD 118 stores image data.

The concentration gamma unit 1506 controls the gamma concentration of the image data by reviewing the process mode information when each of the external PCs 126 and 127 requests image data.

When each of the external PCs 126 and 127 designate a change in the notch information, the concentration gamma unit 1506 controls the gamma concentration based on the changed notch information.

In this example the compression unit 1508 converts the data format of the image data requested by the external PC 126 to JPEG.

The compression unit 1508 converts the data format of the image data requested by the external PC 127 to TIFF, wherein the TIFF data is compressed by MHMR.

The HDD 118 stores process mode information input from the operation unit 300 with the image data.

Therefore, when external PCs 126 and 127 acquire image data without changing attributes of the image data stored in the HDD 118, the external PCs 126 and 127 do not need to designate the image data attributes.

Above-described exemplary image data generation and transmission process explained with reference to FIG. 17 is conducted in accordance with the flow charts illustrated in FIGS. 12-13. However, in the example illustrated in FIG. 17, a data format converting process requires a publicly known process for converting color image data to monochrome image data between steps S1301 and step S1302 in the flow chart of FIG. 13.

As discussed above, the image processing apparatus, method and program according to exemplary embodiments of the present invention can generate image data from a scanned document of a small data size in a general data format, used by a plurality of image processing apparatuses.

Therefore, the image processing apparatus according to the exemplary embodiments of the present invention can realize effective data transmission and data utilization by a plurality of external apparatuses.

The image data generation and transmission method according to the exemplary embodiments of the present invention can be realized by preparing and running a computer readable program on a computer (e.g., personal computer or workstation).

The computer readable program can be stored on a hard disk, flexible disk, CD-ROM (compact disk read-only memory), MO (magneto-optical) disk, DVD (digital versatile disc), or other recording mediums. The program can be read and run by a computer.

Furthermore, the computer readable program may be transmitted and downloaded to a computer via a network, (e.g., Internet).

The invention may be conveniently implemented using a conventional general purpose digital computer programmed according to the teachings of the present specification, as will be apparent to those skilled in the computer art. Appropriate software coding can readily be prepared by skilled programmers based on the teaching of the present disclosure, as will be apparent to those skilled in the software art. The present invention may also be implemented by the preparation of application specific integrated circuits or by interconnecting an appropriate network of conventional component circuits, as will be apparent to those skilled in the art.

Numerous additional modifications and variations are possible in light of the above teachings. Therefore, it is to be understood that within the scope of the appended claims, the disclosure of the present invention may be practiced in a variety of ways not limited to those specifically described herein.

What is claimed is:

1. An image processing apparatus connected to an external apparatus via a network, comprising:
   a selecting unit configured for selecting an application mode and an image quality mode;
   a scanning unit configured for scanning an original document to generate image signals;
   a scanning correction unit configured for generating image data by conducting a first predetermined image processing, according to the application mode and the image quality mode, to the image signals;
   a storage unit configured for storing the image data, the application mode and the image quality mode;
   a compression unit configured for compressing the image data when storing the image data to the storage unit;
   an extension unit configured for extending the compressed image data;
   a data format converting unit configured for converting a data format of the image data according to the application mode and the image quality mode; and
   a communication unit configured for communicating the image data with the external apparatus,
   wherein the application mode includes copy mode, scan mode, and facsimile mode, and the image quality mode includes character mode, character-photo mode, and photo mode.

2. The image processing apparatus according to claim 1, the data format converting unit further comprising:
   a data extension unit configured for extending the compressed image data;
   an image processing unit configured for conducting a second predetermined image processing to the extended image data; and
   a data compression unit configured for compressing the extended image data.

3. The image processing apparatus according to claim 2, wherein the data format converting unit receives image data having a first data format, and outputs the image data having a second data format.

4. The image processing apparatus according to claim 3, wherein the first data format is a data format of the image processing apparatus or a general data format.

5. The image processing apparatus according to claim 3, wherein the second data format is a data format of the image processing apparatus or a general data format.

6. The image processing apparatus according to claim 2, the data format converting unit further comprising a resolution converting unit configured for converting a resolution level of image data input to the data format converting unit.

7. The image processing apparatus according to claim 2, the data format converting unit further comprising a color-space conversion unit configured for converting a color space of image data, input to the data format converting unit, to another color space.

8. The image processing apparatus according to claim 2, the data format converting unit further comprising a monochrome converting unit configured for converting color image data, input to the data format converting unit, to monochrome image data.

9. The image processing apparatus according to claim 2, the data format converting unit further comprising a spot noise elimination unit configured for conducting a spot noise elimination process to image data input to the data format converting unit.

10. The image processing apparatus according to claim 2, the data format converting unit further comprising a filtering unit configured for conducting a predetermined filtering process to image data input to the data format.

11. The image processing apparatus according to claim 2, the data format converting unit further comprising a concentration gamma processing unit configured for conducting a predetermined concentration gamma processing to image data input to the data format converting unit.

12. The image processing apparatus according to claim 2, the data format converting unit further comprising a binary-format processing unit configured for converting multi-value image data, input to the data format converting unit, to binary-formatted image data.

13. The image processing apparatus according to claim 2, wherein the data format converting unit further processes the image data, input to the data format converting unit, according to the application mode and the image quality mode designated by the external apparatus and received by the data format converting unit via the communication unit.

14. An image processing apparatus connected to an external apparatus via a network, comprising:
    means for selecting an application mode and an image quality mode;
    means for scanning an original document to generate image signals;
    means for correcting the image signals to generate image data by conducting a first predetermined image processing according to the application mode and the image quality mode to the image signals;
    means for storing the image data and the application mode and the image quality mode;
    means for compressing the image data;
    means for extending the compressed image data;
    means for converting a data format of the image data according to the application mode and the image quality mode; and
    means for communicating the image data with the external apparatus,
    wherein the application mode includes copy mode, scan mode, and facsimile mode, and the image quality mode includes character mode, character-photo mode, and photo mode.

15. An image data generation and transmission method conducted in an image processing apparatus connected to an external apparatus via a network, comprising the steps of:
    selecting an application mode and an image quality mode;
    scanning an original document to generate image signals;
    correcting the image signals to obtain image data;
    storing the image data, the application mode and the image quality mode;
    converting an attribute of the image data according to the application mode and the image quality mode; and
    transmitting the image data converted in the converting step to the external apparatus.

16. The image data generation and transmission method according to claim 15, further comprising the steps of:
    requesting, by the external apparatus, an acquisition of the image data; and
    designating the application mode and the image quality mode, by the external apparatus, for the requested image data.

17. The image data generation and transmission method according to claim 16, wherein the converting step converts an attribute of the image data stored in the storing step according to the application mode and the image quality mode designated by the external apparatus in the designating step.

18. The image data generation and transmission method according to claim 15, further comprising the step of compressing the image data.

19. The image data generation and transmission method according to claim 15, wherein the converting step further comprises the steps of: extending the image data, performing image processing on the image data, and compressing the image data.

20. The image data generation and transmission method according to claim 15, wherein the converting step further comprises the steps of:
    receiving image data having a first data format; and
    outputting the image data having a second data format.

21. The image data generation and transmission method according to claim 20, wherein the first data format includes a data format dedicated to the image processing apparatus and a general data format.

22. The image data generation and transmission method according to claim 20, wherein the second data format includes a data format dedicated to the image processing apparatus and a general data format.

23. The image data generation and transmission method according to claim 15, wherein the converting step converts an attribute of the image data stored in the storing step according to the application mode and the image quality mode selected in the selecting step.

24. The image data generation and transmission method according to claim 15, wherein the converting step further comprises the steps of:
    extending compressed image data;
    altering a resolution of the extended image data;
    changing a color space of the altered image data to another color space; and
    compressing the image data of the another color space.

25. The image data generation and transmission method according to claim 15, wherein the converting step further comprising the steps of:
    extending compressed image data;
    altering a resolution of the extended image data;
    changing the resolution altered image data to monochrome image data;
    eliminating a spot noise from the monochrome image data;
    filtering the monochrome image data;
    gamma-processing the monochrome image data;
    binary-formatting the monochrome image data; and
    compressing the binary-formatted monochrome image data.

26. A computer-readable medium storing a image data generation and transmission program comprising computer-readable instructions that, when executed by a computer of an image processing apparatus connected to an external apparatus via a network, instruct the image processing apparatus to carry out a method of generating and transmitting image data comprising the steps of:
    selecting an application mode and an image quality mode;
    correcting at least one image signal to obtain image data;
    converting an attribute of the image data according to the application mode and the image quality mode selected in the selecting step; and
    transmitting the image data converted in the converting step to the external apparatus.

27. The computer-readable medium storing the image data generation and transmission program according to the claim 26, the image data generation and transmission program further comprising the steps of:

requesting, by the external apparatus, an acquisition of the image data; and designating the application mode and the image quality mode for the requested image data.

28. The computer-readable medium storing the image data generation and transmission program according to the claim 26, wherein the image data generation and transmission program further causes the image processing apparatus to store the computer-readable instructions in a computer-readable medium provided in the image processing apparatus.

29. The computer-readable medium storing the image data generation and transmission program according to the claim 26, the image data generation and transmission program further comprising downloading the computer-readable instructions from the network.

30. A computer-readable medium storing an image data generation and transmission program comprising computer-readable instructions that, when executed by a computer of an image forming apparatus connected to an external apparatus via a network, instruct the image forming apparatus to carry out a method of image data generating and transmitting, the image data generation and transmission program comprising the steps of:

selecting an application mode and an image quality mode;

scanning an original document to generate image signals;

correcting the image signals to obtain image data;

storing the image data, the application mode and the image quality mode;

converting an attribute of the image data according to the application mode and the image quality mode; and transmitting the image data converted in the converting step to the external apparatus.

31. The computer-readable medium storing the image data generation and transmission program according to claim 30, the image data generation and transmission program further comprising the steps of:

requesting by the external apparatus, an acquisition of the image data; and designating, by the external apparatus, the application mode and the image quality mode for the requested image data.

* * * * *